(12) United States Patent
Thurnau (10) Patent No.: US 8,037,693 B2
(45) Date of Patent: Oct. 18, 2011

(54) METHOD, APPARATUS, AND SYSTEM FOR COOLING AN OBJECT

(75) Inventor: Edwin Thurnau, McGaheysville, VA (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 827 days.

(21) Appl. No.: 12/119,768

(22) Filed: May 13, 2008

(65) Prior Publication Data

US 2009/0282838 A1  Nov. 19, 2009

(51) Int. Cl.
*F25B 9/00* (2006.01)
*F28G 7/00* (2006.01)

(52) U.S. Cl. ............................. 62/6; 165/84

(58) Field of Classification Search ............... 62/6, 56, 62/116, 118, 498, 520; 60/508–514; 165/83–84, 165/104.23, 908
See application file for complete search history.

(56) References Cited

U.S. PATENT DOCUMENTS

| | | | |
|---|---|---|---|
| 2,836,033 A | 5/1958 | Marrison | |
| 3,843,910 A * | 10/1974 | Ringuet | 361/696 |
| 4,398,398 A | 8/1983 | Wheatley et al. | |
| 4,584,840 A | 4/1986 | Baumann | |
| 4,722,201 A | 2/1988 | Hofler et al. | |
| 4,858,441 A * | 8/1989 | Wheatley et al. | 62/6 |
| 5,120,332 A | 6/1992 | Wells | |
| 5,303,555 A | 4/1994 | Chrysler et al. | |
| 5,412,950 A | 5/1995 | Hu | |
| 5,673,561 A | 10/1997 | Moss | |
| 6,164,073 A | 12/2000 | Swift et al. | |
| 6,314,740 B1 | 11/2001 | De Blok et al. | |
| 6,588,224 B1 | 7/2003 | Arman et al. | |
| 6,588,497 B1 * | 7/2003 | Glezer et al. | 165/84 |
| 6,637,211 B1 * | 10/2003 | Swift et al. | 62/6 |
| 6,711,905 B2 | 3/2004 | Howard | |
| 6,978,611 B1 * | 12/2005 | Landis | 60/513 |
| 7,263,837 B2 * | 9/2007 | Smith | 62/6 |
| 2006/0266041 A1 | 11/2006 | Fellows | |
| 2006/0266052 A1 * | 11/2006 | Hsing et al. | 62/6 |

FOREIGN PATENT DOCUMENTS

WO  2004088218 A1  10/2004

OTHER PUBLICATIONS

PCT/US2009/039889 Search Report and Written Opinion, Apr. 6, 2010.
G. Swift, S. Backhaus: "Gas Diodes for Thermoacoustic Self-circulating Heat Exchangers", Jul. 18, 2005, Retrieved from the Internet: URL:http://www.lanl.gov/thermoacoustics/Pubs/isnaTuPM209Rev1.pdf (retrieved on Apr. 27, 2010) whole document.
Swift, Greg and Backhaus, Scott, Gas Diodes for Thermoacoustic Self-circulating Heat Exchangers, Jun. 20, 2005.
Symko, Orest G., Acoustic Approach to Thermal Management: Miniature Thermoacoustic Engines, May 30, 2006.

* cited by examiner

*Primary Examiner* — Frantz Jules
*Assistant Examiner* — Emmanuel Duke
(74) *Attorney, Agent, or Firm* — GE Global Patent Operation; Mark A. Conklin (57) ABSTRACT

A method for cooling an object includes coupling a cooling device to the object, wherein the cooling device includes at least one thermoacoustic engine and a plurality of gas diodes, generating acoustic power with the thermoacoustic engine, channeling acoustic oscillations of a fluid through the gas diodes, and transferring the heat produced by the object to the fluid to facilitate moving the heat away from the object.

17 Claims, 5 Drawing Sheets

METHOD, APPARATUS, AND SYSTEM FOR COOLING AN OBJECT

BACKGROUND OF THE INVENTION

The subject matter disclosed herein relates generally to cooling an object and, more specifically, to cooling an object using a thermoacoustic driven heat sink.

Use of high performance microprocessors has become more common in commercial electronics, such as computers. Such microprocessors may require high thermal dissipation due to significant heat energy generation. At least some known microprocessors are capable of dissipating approximately 100 Watts per square centimeter ($W/cm^2$). At least some known commercial electronics support such dissipation requirements using fan driven forced air heat sink cooling. However, fan driven cooling often has a relatively short mean time between failure value (MTBF), such as approximately three years. Moreover, fan driven cooling has been known to increase particle contamination of circuit board assemblies used with such microprocessors.

At least some knows industrial electronics have been unable to take advantage of developments in high performance microprocessor technology due to industrial reliability requirements that are more stringent than commercial electronics. For example, at least some known industrial electronics require MTBF values of at least twenty years. Moreover, industrial operating environment limitations may be different from those that apply to commercial electronics. For example, at least some known industrial electronics require ambient air to be less than approximately 60° C. As such, there are few options that may be used to cool high performance microprocessors in industrial electronics.

Accordingly, it is desirable to provide a means to cool an object, such as a high performance microprocessor, in which there are no moving parts, to facilitate a higher reliability.

BRIEF DESCRIPTION OF THE INVENTION

In one aspect, a method for cooling an object includes coupling a cooling device to the object, wherein the cooling device includes at least one thermoacoustic engine and a plurality of gas diodes, generating acoustic power with the thermoacoustic engine, channeling acoustic oscillations of a fluid through the gas diodes, and transferring the heat produced by the object to the fluid to facilitate moving the heat away from the object.

In another aspect, a thermoacoustic driven cooling device includes at least one thermoacoustic engine configured to absorb heat produced by a heat source and generate acoustic power using the absorbed heat. The device also includes a fluid inlet defined within said thermoacoustic driven cooling device and a fluid outlet defined within said thermoacoustic driven cooling device. A plurality of gas diodes are configured to channel a cooling fluid through the thermoacoustic driven cooling device using the acoustic power such that the absorbed heat is transferred from the thermoacoustic engine to the fluid to facilitate moving the absorbed heat away from the object.

In another aspect, a cooling system includes a thermoacoustic driven cooling device including at least one thermoacoustic engine configured to absorb heat produced by a heat source and generate acoustic power using the absorbed heat. A plurality of gas diodes are configured to channel a cooling fluid through the thermoacoustic driven cooling device using the acoustic power such that the absorbed heat is transferred from the thermoacoustic engine to the fluid to facilitate carry the absorbed heat away from the object. The cooling system also includes a heat sink coupled to the thermoacoustic driven cooling device that is configured to absorb heat removed from the object and to transfer the heat to the fluid as the fluid exits said thermoacoustic driven cooling device.

DETAILED DESCRIPTION OF THE INVENTION

As used herein, the term "thermoacoustic engine" refers to a prime mover type of thermoacoustic device that uses heat to create a temperature gradient in a stack of plates. The temperature gradient leads to a production of sound within a resonator that is coupled to the stack. More specifically, sound is produced according to a thermal interaction between a working fluid and each plate in the stack.

As used herein, the term "fluid" refers to a fluid, such as air, that is capable of flowing into a thermoacoustic engine and interacting with the stack to produce sound.

As used herein, the term "heat source" refers to an object to be cooled using a cooling system such as described herein. Examples of heat sources include, but are not limited to only including, a microprocessor and/or an integrated circuit. It will be appreciated that alternative heat sources may also be cooled using the cooling system described herein.

As used herein, the term "gas diode" refers to an asymmetrical apparatus that is formed so as to direct fluid flow in one direction over another, opposite direction, with a low rate of flow reversal. Gas diodes are capable, as described herein, of at least partially converting an oscillating fluid flow into a steady fluid flow.

Figure 1:
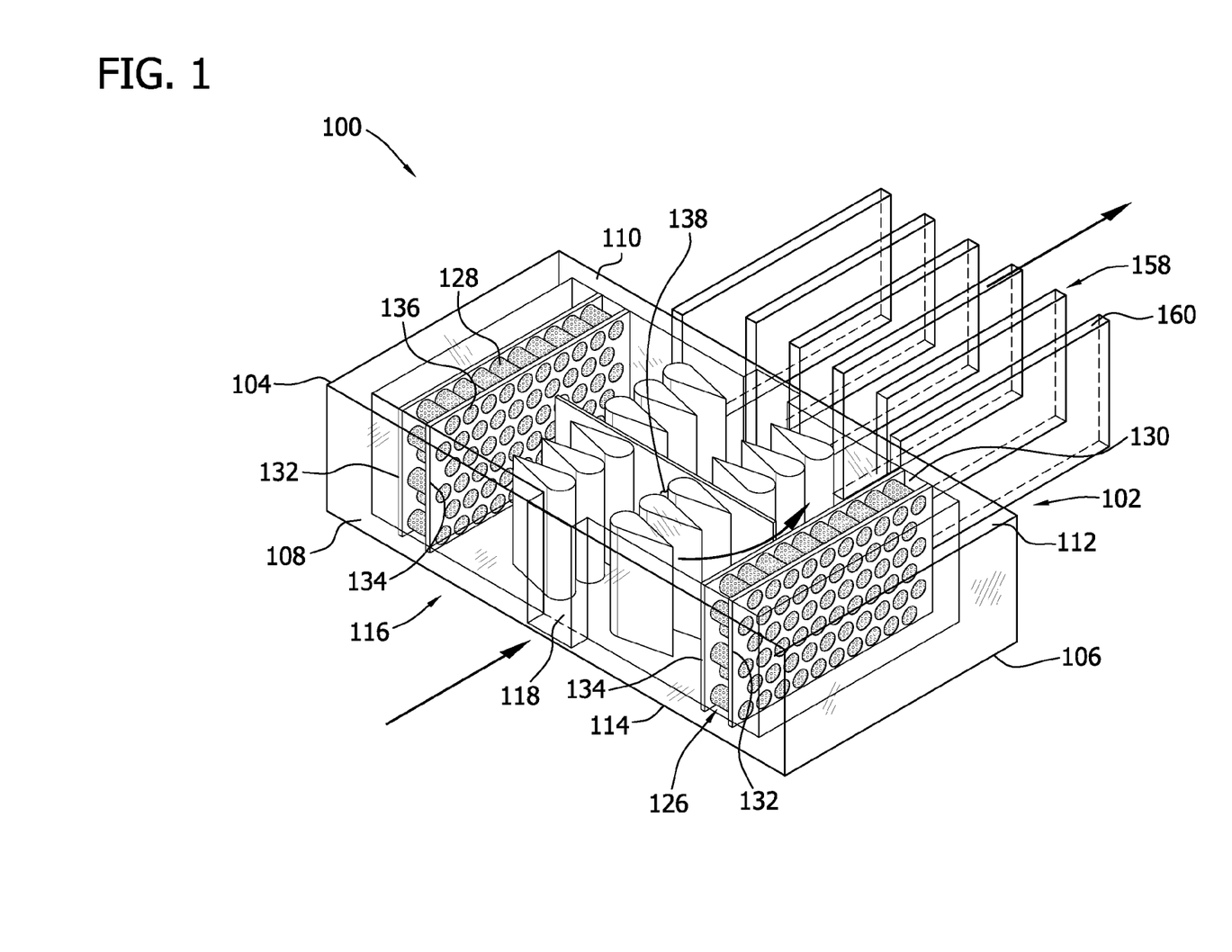
FIG. 1 is a perspective view of an exemplary cooling system for cooling a heat source.
Figure 2:
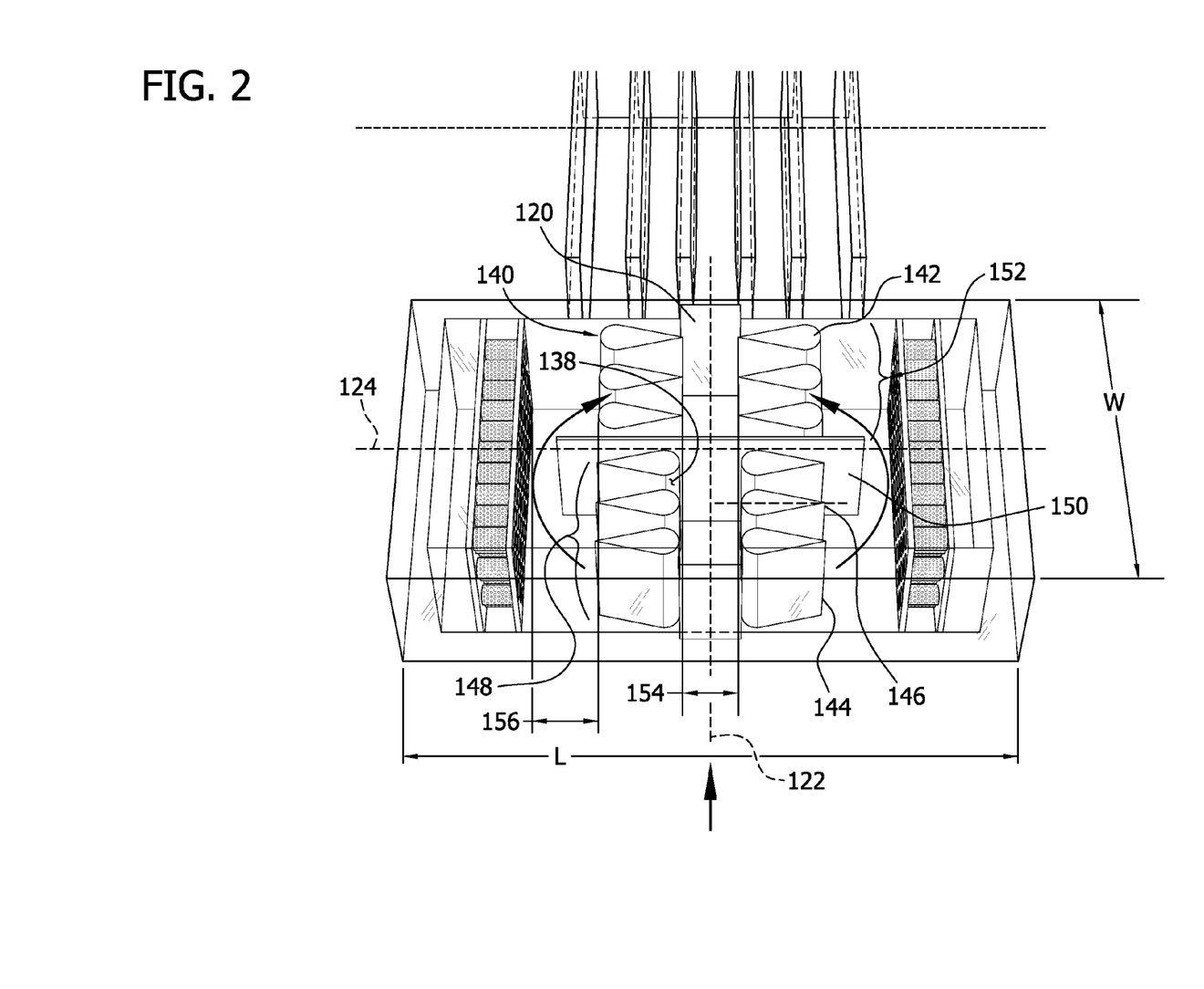
FIG. 2 is a second perspective view of the cooling system shown in FIG. 1.
Figure 3:
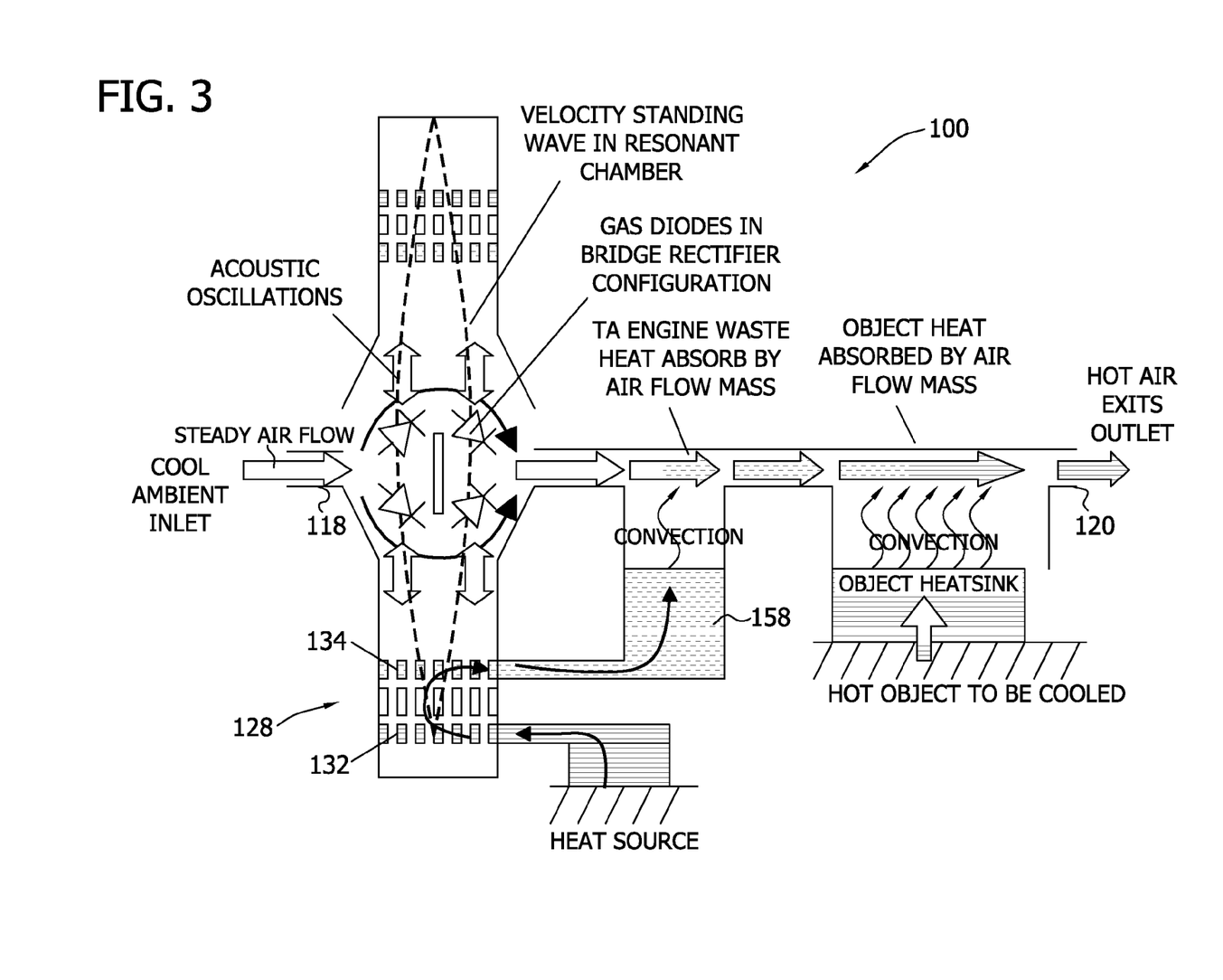
FIG. 3 is a simplified block diagram illustrating the air flow and heat transfer within the cooling system shown in FIG. 1.

FIG. 1 is a perspective view of an exemplary cooling system 100 for cooling a heat source (not shown). FIG. 2 is another perspective view of system 100. FIG. 3 is a simplified block diagram of system 100 that illustrating the air flow and heat transfer within system 100. In the exemplary embodiment, system 100 includes thermoacoustic driven cooling device 102. Device 102 includes a first end 104, a second end 106 that is opposite first end 106, a first side 108, a second side 110 that is opposite first side 108, a top surface 112, and a bottom surface 114. A length, L, is defined between first end 104 and second end 106. A width, W, is defined between first side 108 and second side 110. Device 102 may be formed from, for example, a metallic material to facilitate transferring heat from the heat source to device 102. In alternative embodiments, device 102 may be formed of any suitable material. In the exemplary embodiment, device 102 is electrically heated with power by a cable (not shown) that couples system 100 to a power supply (not shown) of an item of industrial electronics and/or commercial electronics (not shown) that includes the object to be cooled. In an alternative embodiment, device 102 is positioned in direct contact with the heat source so that heat created by the heat source is transferred directly to device 102. In another alternative embodiment, device 102 is positioned in contact with a thermal conducting material, such as copper, which transfers heat created by the heat source to device 102.

In the exemplary embodiment, first end 104 and second end 106 define a resonator, such as a half-wave resonator 116. Accordingly, length, L, may be a sub-multiple of a wavelength. First side 108 defines a fluid inlet 118 that enables a fluid, such as air, to enter half-wave resonator 116. In alternative embodiments, other fluids may be used. In the exemplary embodiment, second side 110 defines a fluid outlet 120 that enables the fluid to exit half-wave resonator 116. A first axis 122 is defined between inlet 118 and outlet 120 of device 102, as shown in FIG. 2. A second axis 124 is orthogonal to first axis 122 and is defined between first end 104 and second end 106.

Moreover, in the exemplary embodiment, thermoacoustic driven cooling device 102 includes at least one thermoacoustic engine 126. Thermoacoustic engine 126 includes a first stack 128 that is positioned between first side 108 and second side 110 at first end 104. Similarly, thermoacoustic engine 126 includes a second stack 130 that is positioned between first side 108 and second side 110 at second end 106. Each stack 128 and 130 includes a first heat exchanger 132, or a hot end, and a second heat exchanger 134, or a cold end. Alternative embodiments of thermoacoustic driven cooling device 102 may include one stack or more than two stacks. Moreover, alternative embodiments may include more than two heat exchangers in each stack. A plurality of channels 136 extend through each stack 128 and 130 and the corresponding first and second heat exchangers 132 and 134. First heat exchanger 132 is a hot side of each stack 128 and 130 and is electrically heated with power by a cable (not shown) that couples system 100 to a power supply (not shown) of an item of industrial electronics and/or commercial electronics (not shown) that includes the object to be cooled. The heat from first heat exchanger 132 propagates through channels 136 to second heat exchanger 134, which is a cold side of each stack 128 and 130. Second heat exchanger 134 conducts the heat flow to the fluid moving through thermoacoustic driven cooling device 102 and partially raises the temperature of the moving fluid.

System 100 also includes a plurality of gas diodes 138. In the exemplary embodiment, gas diodes 138 are arranged in a bridge rectifier configuration, as shown in FIG. 3. Each gas diode 138 is defined by a space between successive asymmetric airfoils 140, as shown in FIG. 2. Each airfoil 140 includes an first end 142 and a second end 144 and is oriented parallel to second axis 124. Moreover, each airfoil 140 defines an airfoil axis 146 between airfoil first end 142 and airfoil second end 144, such that airfoil axis 146 is parallel with second axis 124. A first set of gas diodes 148 (shown in FIG. 1) is positioned between first side 108 and a barrier 150 (shown in FIG. 1) that is aligned along second axis 124. A second set of gas diodes 152 is positioned between barrier 150 and second side 110. Alternative embodiments of device 102 may include more or fewer sets of gas diodes. In the exemplary embodiment, first set of gas diodes 148 is oriented such that first end 142 of each airfoil 140 is positioned inward of second end 144 with respect to first axis 122. As such, a fluid, such as air, that enters device 102 through inlet 118 is channeled outward away from first axis 122 towards first stack 128 and/or second stack 130. A pressure gradient between an inner area 154 along first axis 122 and an outer area 156 defined by second ends 144 of each airfoil 140 of first set 148 creates a channeling effect on the fluid which forces the fluid to flow await from inner area 154 towards outer area 156. Conversely, second set of gas diodes 152 is oriented such that second end 144 of each airfoil 140 is positioned inward of first end 142 with respect to first axis 122. A pressure gradient between outer area 156 defined by first ends 142 of each airfoil 140 of second set 152 and inner area 154 along first axis 122 forces the fluid to flow away from outer area 156 towards inner area 154.

In the exemplary embodiment, a heat sink 158 is coupled to the object to be cooled (not shown). Heat sink 158 includes a plurality of plates 160. Each plate 160 is oriented parallel to first axis 122. As the fluid exits outlet 120, heat energy is transferred from heat sink 158 to the exiting fluid.

The emitted audible sound of thermoacoustic driven cooling device 102 may be undesirable in some embodiments. As such, device 102 may be sized to dictate a frequency of oscillation of the working fluid, thereby operating device 102 at a frequency above or below a range of human hearing. Alternately, a sound dampening structure (not shown) may be added to inlet 118 and/or outlet 120 to attenuate the emitted sound.

During operation, thermoacoustic driven cooling device 102 uses external electrical heating from one or more heat sources to raise the temperature of first heat exchanger 132, causing heat energy flows into first heat exchanger 132 of thermoacoustic engine 126. As first heat exchanger 132 reaches a critical temperature elevation above second heat exchanger 134, thermoacoustic engine 126 will begin to generate acoustic oscillations in the fluid. These acoustic oscillations will begin to move cool ambient fluid through thermoacoustic driven cooling device 102. More specifically, the acoustic oscillations move cool ambient fluid through inlet 118, through the plurality of gas diodes 138 oriented in a bridge rectifier configuration, and through outlet 120. The fluid then flows across heatsink 158, where the cool moving ambient fluid absorbs heat energy from the higher temperature heatsink 158 and carries the heat energy away from heatsink 158.

Figure 4:
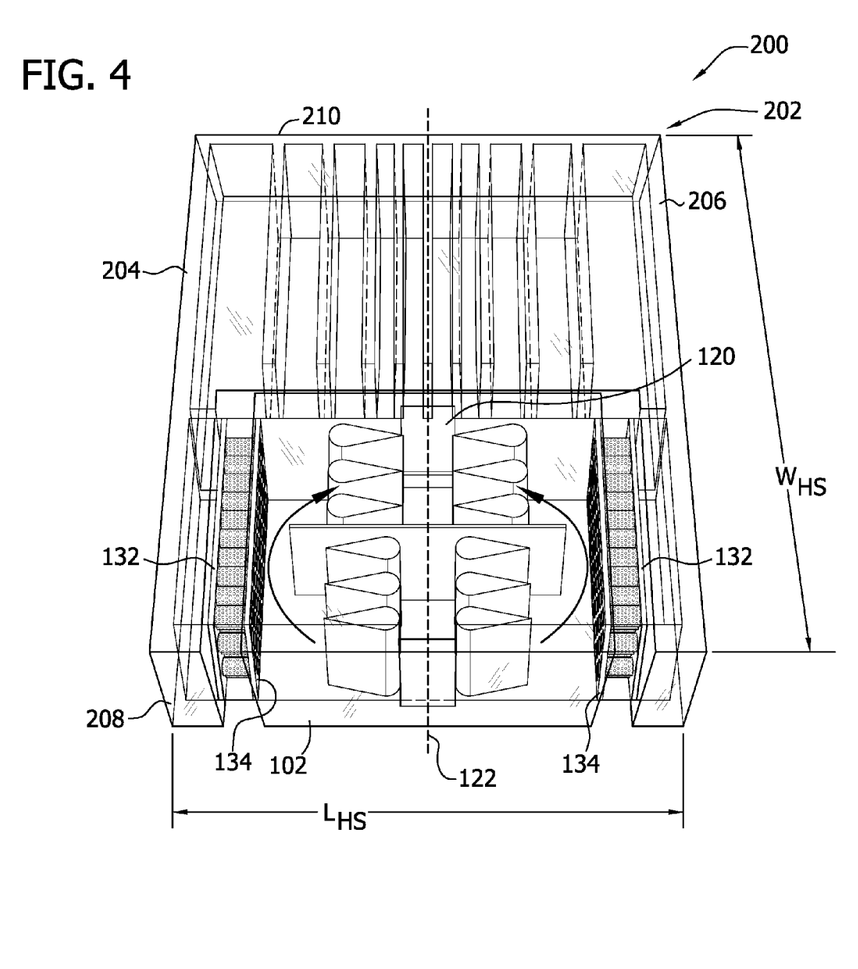
FIG. 4 is a perspective view of a second embodiment of an exemplary cooling system.

FIG. 4 is a perspective view of a second exemplary cooling system 200 for cooling a heat source (not shown). More specifically, system 200 is a self-powered cooling system. System 200 includes thermoacoustic driven cooling device 102, as described above, and a heat sink 202. Heat sink 202 includes a first end 204, a second end 206 that is opposite first end 204, a first side 208, and a second side 210 that is opposite first side 208. A length, $L_{HS}$, is defined between first end 204 and second end 206. A width, $W_{HS}$, is defined between first side 208 and second side 210. First end 204 is sized to receive first end 104 of thermoacoustic driven cooling device 102, and second end 206 is sized to receive second end 106 of thermoacoustic driven cooling device 102.

During operation, thermoacoustic driven cooling device 102 functions as described above to drive fluid flow, except that instead of using external electrical heating to raise the temperature of first heat exchanger 132 as described above, heatsink 202 is shaped to contact first heat exchanger 132 of each stack 128 and 130 such that the elevated temperature of heatsink 202 raises the temperature of each first heat exchanger 132. As such, a feedback loop is created where, as the object to be cooled produces heat energy, its temperature will rise and heat energy will flow into heatsink 202. Then as the heatsink temperature rises heat energy will flow into each first heat exchanger 132 of thermoacoustic engine 126. As each first heat exchanger 132 reaches a critical temperature elevation above each second heat exchanger 134, thermoacoustic engine 126 will begin to generate acoustic oscillations in the fluid. These acoustic oscillations will begin to move cool ambient fluid through thermoacoustic driven cooling device 102 and across heatsink 202, where the cool moving ambient fluid absorbs heat energy from the higher temperature heatsink 202 and begins to lower the temperature of heatsink 202, thereby reducing the acoustic energy generated. Reducing the acoustic energy in turn reduces the fluid flow which reduces the heat removed from heatsink 202. The temperature of heatsink 202 begins rising again. Such a feedback cycle continues until equilibrium is reached between the heat energy conducted from the object into thermoacoustic driven cooling device 102 matches the change in heat energy absorbed by the ambient fluid flowing out of thermoacoustic driven cooling device 102.

Figure 5:
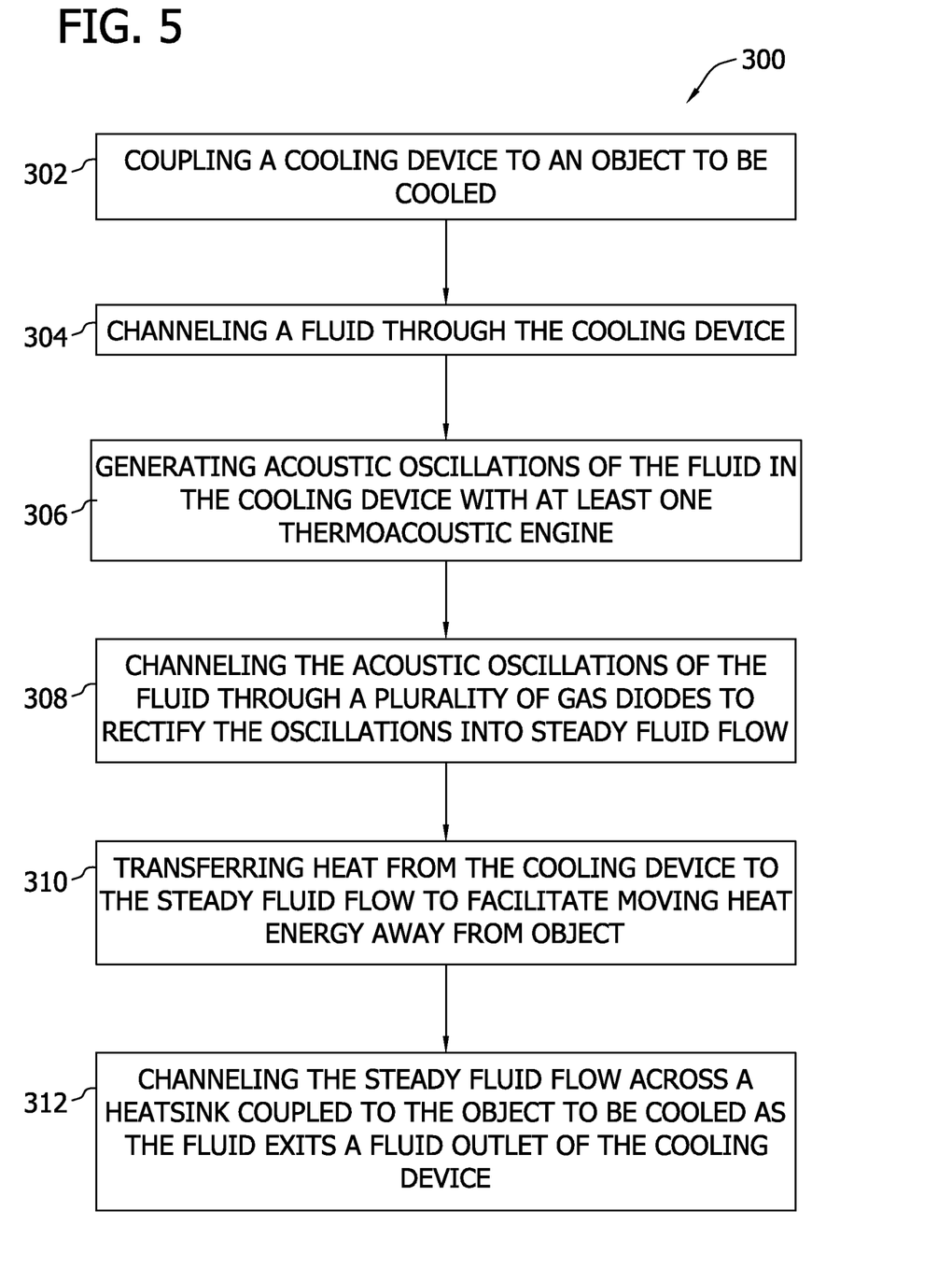
FIG. 5 is a flowchart illustrating an exemplary method for cooling an object using the cooling system shown in FIGS. 1 and 2.

FIG. 5 is a flowchart illustrating an exemplary method 300 for cooling an object, such as a heat source, using cooling system 100 as described above with reference to FIGS. 1-3 or cooling system 200 as described above with reference to FIG. 4. Referring, for example, to FIGS. 1-3, in the exemplary embodiment, system 100 is coupled 302 to an object to be cooled. In the exemplary embodiment, device 102 is electrically heated with power by a cable (not shown) that couples system 100 to a power supply (not shown) of an item of industrial electronics and/or commercial electronics (not shown) that includes the object to be cooled. In an alternative embodiment, device 102 is coupled in direct contact with the object so that heat created by the object is transferred directly to device 102. In another alternative embodiment, device 102 is coupled in contact with a thermal conducting material, such as copper, which transfers heat created by the object to device 102.

In the exemplary embodiment, a fluid is channeled 304 into device 102 through inlet 118. As heat is transferred to device 102, acoustic oscillations of the fluid are generated 306 by first stack 128 and/or second stack 130. The acoustic oscillations resonate within device 102, building in amplitude and resulting in significant oscillating motion of the fluid within device 102, back and forth between first end 104 and second end 106.

The fluid is then channeled 308 through a plurality of gas diodes 138 positioned in a bridge rectifier configuration. More specifically, the fluid is channeled through first set of gas diodes 148 outward away from first axis 122 towards first stack 128 and/or second stack 130. A pressure gradient between inner area 154 and outer area 156 creates a channeling effect that forces the fluid to flow away from inner area 154 towards outer area 156. The fluid is then channeled through second set of gas diodes 152 away from first stack 128 and/or second stack 130 towards first axis 122 and, thus, towards outlet 120. A pressure gradient between outer area 156 and inner area 154 forces the fluid to flow away from outer area 156 towards inner area 154. By channeling the fluid through device 102 in such a fashion, the oscillations of the fluid are rectified into a steady fluid flow. While being channeled through gas diodes 138, heat is transferred 310 to the fluid to facilitate moving the heat away from device 102. As the fluid exits device 102 through outlet 120, the fluid is channeled 312 across heatsink 158 such that heat energy is transferred from heatsink 158 to the fluid to facilitate additional cooling of the object.

The above-described method, system, and apparatus facilitate cooling an object without the use of moving parts. Cooling the object without using moving parts facilitates a higher mean time between failure and, therefore, improved cooling compared to natural convection but with equivalent reliability, which enables higher power microprocessors, integrated circuits, and other electronic components to be used in industrial products.

Exemplary embodiments of methods, systems, and apparatus for cooling an object are described above in detail. The methods, systems, and apparatus are not limited to the specific embodiments described herein but, rather, steps of the methods and/or components of the systems and/or apparatus may be utilized independently and separately from other steps and/or components described herein. Further, the described method steps and/or system or apparatus components may also be defined in, or used in combination with, other methods, systems, and/or apparatus, and are not limited to practice with only the methods, systems, and apparatus as described herein.

As used herein, an element or step recited in the singular and proceeded with the word "a" or "an" should be understood as not excluding a plurality of said elements or steps, unless such exclusion is explicitly recited. Further, references to one above-described embodiment are not intended to be interpreted as excluding the existence of additional embodiments that also incorporate the recited features.

While the subject matter disclosed herein has been described in terms of various specific embodiments, those skilled in the art will recognize that the above-described embodiments may be practiced with modification within the spirit and scope of the claims.

What is claimed is:

1. A method for cooling an object using a cooling device coupled to the object, the cooling device including at least one thermoacoustic engine and a plurality of gas diodes arranged in a bridge rectifier configuration, said method comprising: generating acoustic power with the at least one thermoacoustic engine; channeling acoustic oscillations of a fluid through the plurality of gas diodes comprises channeling the fluid into the cooling device through an inlet, channeling the fluid through the bridge rectifier, and channeling the fluid out of the cooling device through an outlet; and transferring the heat produced by the object to the fluid to facilitate moving the heat away from the object.

2. A method for cooling an object in accordance with claim 1, wherein generating acoustic power with the at least one thermoacoustic engine comprises generating acoustic oscillations of the fluid using heat produced by a heat source.

3. A method for cooling an object in accordance with claim 2, wherein the at least one thermoacoustic engine includes at least one stack having a hot end and a cold end, and wherein transferring the heat produced by the object to the fluid comprises:
    absorbing the heat produced by the object with the hot end; and
    cooling the cold end using the fluid channeled through the plurality of gas diodes.

4. A method for cooling an object in accordance with claim 3, further comprising:
    channeling the fluid through a heat sink coupled to the cooling device as the fluid exits the outlet; and
    transferring heat from the heat sink to the fluid.

5. A thermoacoustic driven cooling device comprising: at least one thermoacoustic engine configured to absorb heat produced by a heat source and generate acoustic power using the absorbed heat; a fluid inlet defined within said thermoacoustic driven cooling device and a fluid outlet defined within said thermoacoustic driven cooling device; a plurality of gas diodes configured to channel a cooling fluid through said thermoacoustic driven cooling device using the acoustic power such that the absorbed heat is transferred from said at least one thermoacoustic engine to the fluid to facilitate moving the absorbed heat away from the object; and said plurality of diodes axe arranged as a bridge rectifier.

6. A thermoacoustic driven cooling device in accordance with claim 5, wherein said at least one thermoacoustic engine comprises a stack comprising a first heat exchanger and an opposed second heat exchanger, said first heat exchanger configured to absorb the heat produced by the heat source, and said second heat exchanger configured to be cooled by the fluid as the fluid is channeled through said thermoacoustic driven cooling device.

7. A thermoacoustic driven cooling device in accordance with claim 6, wherein an axis is defined between said fluid inlet and said fluid outlet, said plurality of gas diodes comprises:
  a first set of gas diodes positioned with respect to said fluid inlet, said first set of gas diodes configured to channel the fluid away from said axis towards said second heat exchanger of said at least one thermoacoustic engine; and
  a second set of gas diodes positioned with respect to said fluid outlet, said second set of gas diodes is configured to channel the fluid from said second heat exchanger of said at least one thermoacoustic engine towards said axis.

8. A thermoacoustic driven cooling device in accordance with claim 6, wherein said fluid outlet channels the fluid through an exterior heat sink as the fluid exits said thermoacoustic driven cooling device, wherein the fluid absorbs heat from the exterior heat sink.

9. A thermoacoustic driven cooling device in accordance with claim 5, wherein said at least one thermoacoustic engine comprises a first thermoacoustic engine at a first end of said thermoacoustic driven cooling device and a second thermoacoustic engine at a second end of said thermoacoustic driven cooling device opposite said first end, such that said first thermoacoustic engine and said second thermoacoustic engine define a half-wave resonator.

10. A thermoacoustic driven cooling device in accordance with claim 9, wherein said fluid inlet is defined at a first acoustic zero pressure node of said half-wave resonator and said fluid outlet is defined at a second acoustic zero pressure node of said half-way resonator.

11. A thermoacoustic driven cooling device in accordance with claim 5, further comprising at least one sound dampening structure positioned with respect to at least one of said fluid inlet and said fluid outlet.

12. A cooling system comprising: a thermoacoustic driven cooling device comprising: at least one thermoacoustic engine configured to absorb heat produced by a heat source and generate acoustic power using the absorbed heat; and a plurality of gas diodes configured to channel a cooling fluid through said thermoacoustic driven cooling device using the acoustic power such that the absorbed heat is transferred from said at least one thermoacoustic engine to the fluid to facilitate moving the absorbed heat away from the object; and a heat sink coupled to said thermoacoustic driven cooling device, said heat sink configured to absorb heat removed from the object and to transfer the heat to the fluid as the fluid exits said thermoacoustic driven cooling device; and an axis is defined between a fluid inlet and a fluid outlet of said thermoacoustic driven cooling device, said plurality of gas diodes comprises: a first set of gas diodes positioned with respect to said fluid inlet, said first set of gas diodes configured to channel the fluid away from said axis towards said second heat exchanger of said at least one thermoacoustic engine; and a second set of gas diodes positioned with respect to said fluid outlet, said second set of gas diodes is configured to channel the fluid from said second heat exchanger of said at least one thermoacoustic engine towards the axis.

13. A cooling system in accordance with claim 12, wherein said at least one thermoacoustic engine comprises a stack comprising a first heat exchanger and an opposed second heat exchanger, said first heat exchanger configured to absorb the heat produced by the heat source, said second heat exchanger configured to be cooled by the fluid as the fluid is channeled through said thermoacoustic driven cooling device.

14. A cooling system in accordance with claim 12, wherein said at least one thermoacoustic engine comprises a first thermoacoustic engine at a first end of said thermoacoustic driven cooling device and a second thermoacoustic engine at a second end of said thermoacoustic driven cooling device opposite said first end.

15. A cooling system in accordance with claim 14, wherein said first thermoacoustic engine and said second thermoacoustic engine define a half-wave resonator.

16. A thermoacoustic driven cooling device in accordance with claim 15, wherein a fluid inlet is defined at a first acoustic zero pressure node of said half-wave resonator and a fluid outlet is defined at a second acoustic zero pressure node of said half-way resonator.

17. A cooling system in accordance with claim 1, wherein said thermoacoustic driven cooling device further comprises at least one sound dampening structure positioned with respect to at least one of said fluid inlet and said fluid outlet.

\* \* \* \* \*

UNITED STATES PATENT AND TRADEMARK OFFICE
CERTIFICATE OF CORRECTION

PATENT NO. : 8,037,693 B2
APPLICATION NO. : 12/119768
DATED : October 18, 2011
INVENTOR(S) : Thurnau Page 1 of 1

It is certified that error appears in the above-identified patent and that said Letters Patent is hereby corrected as shown below:

In Column 1, Line 22, delete "knows" and insert -- known --, therefor.

In Column 3, Line 65, delete "await" and insert -- away --, therefor.

In Column 6, Line 64, in Claim 5, delete "axe" and insert -- are --, therefor.

Signed and Sealed this
Sixth Day of March, 2012

David J. Kappos
*Director of the United States Patent and Trademark Office*